3,162,535
PREPARATION OF DIRECTLY CONSUMABLE
FOOD RATION WHEAT PRODUCTS
Robert E. Ferrel, Richmond, Calif., assignor to the United States of America as represented by the Secretary of Agriculture
No Drawing. Filed Feb. 12, 1962, Ser. No. 172,830
2 Claims. (Cl. 99—80)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes is hereby granted to the Government of the United States of America.

This invention relates in general to the processing of wheat and includes among its objects the provision of novel food products derived from wheat and the provision of processes for preparing these products. Further objects of the invention will be evident from the following description wherein parts and percentages are by weight unless otherwise specified.

For the most part, wheat is utilized in the form of flour and bakery products made therewith. However, some wheat is consumed in the form of whole or cracked grains. Thus the product known as bulgur is an important staple food, particularly in the Middle Eastern countries. Bulgur is essentially dry, parboiled wheat which has culinary uses similar to those of rice. Traditionally, bulgur is prepared by simmering the whole wheat berry in water until the grains become tender. The cooked grains are then spread in the sun to dry. As a final step, the dry grains may be rubbed by hand to remove the outer layers of bran and the grains may be cracked in crude mills. In more modern practice, the whole wheat berry is soaked in hot water until its moisture content is increased to about 40% and the moistened grain is then cooked with steam under pressure to gelatinize the starch in the grains. The resulting cooked grains are then dried in a current of hot air and pearled to remove the outer bran layers. Often the product is cracked although some consumers prefer it in the whole grain form, so that the product is commercially available in both whole grain and cracked grain styles.

In recent years bulgur has been introduced into this country and is becoming increasingly popular. Although bulgur is a flavorsome and nutritious food, it has the disadvantage that its preparation for the table requires considerable time and some degree of skill on the part of the cook. The point is that the product must be cooked to such an extent as to tenderize the grains but the cooking period must not be prolonged to such an extent as to produce a sticky product. Usually, the proper cooking of the bulgur requires heating it in water for 20–40 minutes and care is always required to avoid over-cooking, thus to prevent formation of an unpalatable, sticky product. Also, precautions must be taken to prevent the grains from sticking to the hot surface of the cooking vessel and thus developing offensive odor and taste. These disadvantages have, to a large measure, limited the popularization of bulgur.

By application of the present invention, the disadvantages enumerated above are obviated. The product of the invention is prepared for the table by mixing it with hot water and allowing it to stand for about 5 minutes to absorb the water. No culinary skill is required in preparing it for consumption. Despite this rapidity and simplicity of preparation for the table, the product exhibits a complete separation of grains, i.e., there is no tendency toward stickiness. In addition, the odor, flavor, and texture of the product are virtually the same as those of properly-cooked, high-quality bulgur. Moreover, the products can even be consumed without cooking.

The objects of the invention are attained by a procedure which essentially involves contacting bulgur with a current of hot air to cause the grains to puff, that is, to increase in size. As a result of this treatment, the product has a volume of about 1.5 to 2 times that of the original kernels. Moreover, this expansion does not rupture the kernels nor distort their shape; thus, the expanded kernels have the same shape as the original kernels except that their dimensions are larger, the expansion being caused by the formation of a multitude of small, spheroidal voids uniformly dispersed throughout the interior of the wheat kernels. The wheat material is thus changed from a dense, vitreous material which defies penetration of water to a porous, crisp product which absorbs water readily.

The raw material for the process of the invention is bulgur or dry, parboiled wheat. As noted above, this product is generally made by steeping wheat kernels in water, cooking the moistened kernels with steam, drying the cooked product and milling it to remove the outer bran layers. The raw material for the process of the invention may be in the whole-grain state or in a cracked-grain state, the former being generally preferred. The parboiled wheat may be prepared from many varieties of wheat, such as varieties of hard red spring, hard red winter, soft red winter, white club, soft white, hard white, or durum. In general, it is preferred to use high-protein lots of white wheats or medium-protein lots of red wheats because of their superior processing properties. Where a light colored product is desired, it is preferred to use the white wheats.

In order to achieve a desirable puffing effect, it is necessary that the starting material have the proper moisture content, that is, about 6 to 14%, preferably about 9 to 12% moisture. Thus it has been observed that if the wheat material contains moisture at levels substantially below or above the stated range, the volume increase attained is inadequate for good rehydration properties. The moisture content of the starting material may be adjusted to the desired range by simple methods. For instance, if the material is too moist, it may be subjected to a current of warm air to reduce its moisture content. If, on the other haand, it is too dry, it may be exposed to an atmosphere of moist air until its moisture content is increased to the desired level.

The puffing treatment of the invention is effectuated by contacting bulgur with a current of air having a temperature of about 400 to 650° F., preferably about 500 to 600° F. Because of this high air temperature a rapid heating effect is attained with the result that moisture within the kernels is quickly converted into steam and this formation of steam causes the expansion in volume of the grain. In order to enhance this rapid heating effect, the hot air stream is applied at a high velocity, a preferred range of velocity being 200 to 1,000 ft. per minute. The puffing treatment can be carried out with various types of apparatus. As an example for continuous operation, the grains may be carried on an endless belt of screening past a duct which directs the hot air stream through the bed of material on the belt. Another type of device includes an elongated, vertically-disposed chamber provided with an open upper end and an inlet for hot air at the bottom end. A screen is provided near the bottom of the inlet pipe to prevent the wheat from entering the inlet pipe if the air pressure should drop. In using such apparatus, the starting material is placed on the screen and the hot air is introduced into the chamber at such a velocity that the wheat kernels tumble about in the chamber. Regardless of the type of apparatus used, the exposure of the wheat kernels to the current of hot air is continued for a time long enough for the kernels to reach the desired volume increase. This point can be readily ascertained in practice by removing samples as the process continues and determining their bulk density or specific volume. Although a drying effect is attained with the puffing treatment of the invention, the conditions of puffing are not comparable to those used in drying bulgur. Thus in conventional drying treatments, relatively low temperatures on the order of 150° F. are used with the result that moisture is eliminated slowly and the grains do not puff. On the other hand, in the process of the invention, the high air temperature enhanced by the high air velocity cause such rapid evaporation within the grains that the steam is formed at a faster rate than diffusion to the outer surface can occur, with the result that the grains are puffed.

As noted hereinabove, in the commercial production of bulgur, wheat is subjected to a partial debranning treatment following the soaking, cooking, and drying operations. Generally, the process of the invention is applied to bulgur which has been subjected to such conventional debranning treatment, that is, removal of about 20% of the bran. If desired, however, the bulgur may be subjected to additional debranning prior to application of the hot air treatment. In general, it has been observed that removal of further amounts of bran, for example, to provide a starting material with about 25 to 50% bran removal, yields products which display a greater increase in volume when treated under otherwise identical conditions. The starting material may be treated to remove more than about 50% of the bran but generally this is not desirable because of increasing difficulty of bran removal, increased expense, and higher milling and nutrient losses.

The production of the expanded (puffed) wheat product of the invention is further demonstrated by the following illustrative examples.

Example 1

A lot of whole grain bulgur containing 9% moisture was placed on a screen at a loading of about one pound per square foot and a current of hot air at 650° F. was forced at a velocity of 525 ft./min. upwardly through the bed of wheat kernels. Contact with the hot air was continued for 8 seconds. The specific volume of the wheat kernels was measured (by weighing a 200-ml. sample of the material) before and after the treatment. From these figures the percentage increase in specific volume was calculated.

The process as described above was then repeated with the exceptions that the temperature of the air stream and residence time in the stream were varied. The results obtained are tabulated below.

| Temperature of air stream, °F. | Residence time, seconds | Specific volume of wheat before treatment, ml./gram | Specific volume of wheat after treatment, ml./gram | Increase in specific volume, percent |
|---|---|---|---|---|
| 650 | 8 | 1.27 | 1.90 | 149 |
| 600 | 12 | 1.25 | 2.00 | 161 |
| 550 | 20 | 1.24 | 2.10 | 169 |
| 500 | 30 | 1.24 | 2.05 | 166 |
| 450 | 40 | 1.24 | 1.89 | 152 |
| 400 | 60 | 1.27 | 1.75 | 139 |

Example 2

A lot of whole-grain bulgur containing 6.3% moisture was placed on a screen at a loading of about one pound per square foot and a current of hot air at 510° F. was forced at a velocity of 525 ft./min. upwardly through the bed of wheat kernels for a period of 25 seconds.

The process as described above was repeated with the exception that the procedure was applied to samples of bulgur of varying moisture content.

Measurements of specific volume were made as described in Example 1. The results are tabulated below.

| Moisture content of bulgur, percent | Specific volume before treatment, ml./gram | Specific volume after treatment, ml./gram | Increase in specific volume, percent |
|---|---|---|---|
| 6.3 | 1.27 | 2.03 | 160 |
| 6.6 | 1.29 | 2.08 | 160 |
| 7.7 | 1.29 | 2.14 | 166 |
| 8.8 | 1.26 | 2.13 | 169 |
| 9.7 | 1.28 | 2.15 | 168 |
| 10.5 | 1.30 | 2.14 | 164 |
| 11.7 | 1.35 | 2.19 | 162 |
| 12.6 | 1.35 | 2.16 | 160 |
| 13.2 | 1.36 | 2.14 | 158 |
| 14.1 | 1.36 | 2.16 | 159 |

Example 3

A lot of whole-grain bulgur containing 9% moisture was placed on a screen at a loading of one pound per square foot and a current of hot air at 525° F. was forced at a velocity of 200 ft./min. upwardly through the bed of wheat kernels for a period of 35 seconds.

The process as described above was repeated with the exceptions that the air velocity and residence time in the air stream were varied.

Measurements of specific volume were made as described in Example 1. The results are tabulated below.

| Air velocity, ft./min. | Residence time, seconds | Specific volume before treatment, ml./gram | Specific volume after treatment, ml./gram | Increase in specific volume, percent |
|---|---|---|---|---|
| 200 | 35 | 1.24 | 1.82 | 148 |
| 300 | 30 | 1.27 | 1.99 | 157 |
| 400 | 25 | 1.25 | 2.03 | 163 |
| 500 | 21 | 1.24 | 2.04 | 166 |
| 600 | 20 | 1.25 | 2.05 | 164 |
| 700 | 18 | 1.26 | 1.92 | 153 |

Example 4

The starting material in this run was a lot of whole-grain bulgur which had been prepared by subjecting wheat to soaking, cooking, and drying but omitting the conventional partial debranning treatment. This bulgur containing 9% moisture was placed on a screen at a loading of about one pound per square foot and a current of hot air (510° F.) was passed at a velocity of 550 ft. per min. upwardly through the bed of wheat kernels for a period of 25 seconds. The increase in specific volume was determined as in Example 1.

The process as described above was repeated with the exception that the starting material was subjected to different degrees of debranning (by a conventional milling technique) prior to application of the hot air treatment. The results are tabulated below.

| Bran removed, percent | Increase in specific volume, percent |
|---|---|
| 0 | 154 |
| 20 | 162 |
| 41 | 180 |
| 51 | 179 |
| 53 | 180 |
| 63 | 172 |

The expanded wheat products of the invention have many uses—for example, they may be prepared for the table and consumed as an adjunct to meat dishes or as a main carbohydrate course. Preparation of the product for the table is simply a matter of absorption of hot water. Thus for example, a suitable quantity, say 500 g., of the product is mixed with 1,000 g. of boiling water and the mixture allowed to stand for about 5 minutes so that the wheat grains can absorb the water. The product is then ready for consumption. The usual flavoring agents such as salt, pepper, butter, etc., may be added as desired. The expanded wheat product of the invention may be packaged and sold as such or it may be mixed with other ingredients such as herbs, spices, seasonings, dehydrated meat broth, dried meat, dried mushroom, etc., to provide, for example, pilaf-type dishes on reconstitution. The product may also be used for dessert-type dishes. To this end, the expanded wheat is rehydrated as above described but in this case is sweetened with sugar and flavored with spices, honey, malt, fruit materials, etc. Dessert mixes may be prepared by combining the expanded wheat product with such ingredients as sugar, dehydrated fruit juice, dried milk, dried egg, flavors, etc. Such products on reconstitution with hot water quickly form flavorsome desserts. It is obvious from the above description that the expanded wheat product of the invention may be combined with any desired type of food or flavor to produce comestibles of any desired taste. Usually, the added ingredients are in dry or otherwise stable form so that the formulation can be packaged and sold as a dry mix capable of rapid preparation for the table by adding hot water.

The expanded wheat products of the invention are admirably suited for the preparation of rations for general purposes or particularly for military or civilian use, as in provisioning fall-out shelters. The expanded products are particularly adapted for such use because they can be eaten directly, that is, without addition of water. In this regard, it is to be noted that the products are in a precooked state and since they are in a porous or expanded state, they are tender enough to be eaten directly. In contrast, it may be mentioned that conventional bulgur is so vitreous in texture that it cannot possibly be eaten as such. In preparing ration products, the expanded wheat is formed into bars, wafers, tablets or other suitable shapes by combining the expanded wheat with an edible binder and compressing the mixture into the selected shape. In a preferred embodiment of this aspect of the invention, the following procedure is applied:

The expanded wheat product is reduced to a ground condition. Grinding can be applied initially or after the other ingredients are mixed with the expanded wheat. For best results, it is preferred that the wheat material exhibit a wide spectrum of particle sizes from half-grains or quarter-grains to 60-mesh particles with about 80% of the material coarser than 20-mesh. With such a wide range of particle sizes, several cooperative advantages are gained, namely, improved binding, retention of crispness to give the products a desirable crunchiness when chewed and to permit rapid absorption of liquid additives without causing the mixture to become liquid or pasty in character. Thus it has been found that if the wheat material is uniformly in fine particles, the ration turns into a textureless mush when chewed. On the other hand, if the wheat material is not ground, binding is difficult and the ration tends to be difficult to masticate. By using the wide range of particle sizes, as above described, optimum properties for preparation of the rations and their consumption are yielded.

Having ground the expanded wheat, it is mixed with fat and a water-soluble carbohydrate, these substances acting principally as binders although they also impart some flavor to the ration. Typical of the fats which may be used are natural animal and vegetable fats, hydrogenated fats, fatty acids, and fatty acid monoglycerides. For purposes of stability on storage, saturated fats are recommended. Usually, it is preferred to use a fat having a melting point above body temperature but not above 120° F. In a preferred embodiment of the invention, malt extract is used as the carbohydrate component of the formulation. The advantage in the conjoint use of fat and malt extract is that these ingredients co-act synergistically to prevent rancidification of the product on storage. We have conducted tests with ration wafers consisting of the expanded wheat plus (a) fat alone, (b) malt extract alone, and (c) both fat and malt extract and have found that the ration containing both fat and malt extract (c) exhibited a stability markedly superior to that displayed by the other samples. Although in the preferred embodiment of the invention, malt extract is used as the carbohydrate, it is within the broad purview of the invention to use any water-soluble carbohydrate such as sucrose, glucose, maltose, lactose, corn syrup, corn syrup solids, sorghum syrup or solids, etc. The proportions of expanded wheat, fat, and carbohydrate in the formulations may obviously be varied depending on the characteristics and nutritive properties desired for the ration. Thus, for example, the formulation may vary in the range—

Fat _____ 5 to 20
Carbohydrate _____ 5 to 20
Expanded wheat to make 100%.

A preferred formulation contains expanded wheat 79.5%, fat 10%, dry malt extract 10%, and salt 0.5%.

In mixing the expanded wheat, fat, and carbohydrate, it is usually preferred to add a minor proportion of water to give the mix the proper consistency or texture for pressing into shapes. Usually enough water is added to raise the total moisture content to about 4 to 5%. Ordinarily, this water is not added as such but is first mixed with the water-soluble ingredients (carbohydrate and salt) and the resulting solution is added to the fat and expanded wheat. During mixing the temperature of the mixture is raised to a level sufficient to melt the fat, thus to ensure uniform blending. Having prepared the mixture it is then compressed into the desired shape such as tablets, wafers, pellets, etc. Usualy it is preferred to form the material into wafers having a thickness of about ¼ to ⅓ inch. Forming of the material into the desired shapes is facilitated by keeping the material warm, for example, at 40–60° C. and applying pressures of about 5,000 to 10,000 lbs. per square inch in a conventional die arrangement.

In the preferred formulation of the ration, the sole ingredients are the expanded wheat, fat, malt extract (plus a minor amount of salt) whereby the ration has a flavor which is pleasant but which is not dominant in any particular direction. As a result, the ration can be consumed directly or can be eaten with diverse types of liquids such as fruit juices, vegetable juices, soups, milk, without detracting from the essential flavor of the selected liquid. It is obvious, however, that if such universality is not desired, the rations may be formulated with a distinct taste pattern by incorporation of such ingredients as dehydrated fruit or vegetable juices, dehydrated soups, herbs, spices, dry milk, and the like. Other additives which may be incorporated are such items as fat stabilizers or antioxidants such as butylated hydroxyanisole, butylated hydroxytoluene; vitamins or vitamin precursors; mineral nutrients; or agents to retard absorption of radioactive fall-out ingredients, e.g., calcium salts such as calcium carbonate or dicalcium phosphate to counteract absorption of radioactive strontium, potassium or sodium iodide to counteract absorption of radioactive iodine.

The preparation of a shelter ration in accordance with the invention is described in the following examples:

*Example 5*

A lot of bulgur (dry, parboiled wheat) containing about 10% moisture was contacted with a stream of hot (600° F.) air until there was a 160% increase in the bulk volume of the material.

The expanded wheat prepared as above described was ground to produce a product containing a broad spectrum of particle sizes from half-grains to 60-mesh particles with about 80% of the material coarser than 20-mesh.

The following ingredients were mixed, applying sufficient heat to keep the fat in a liquid condition:

| | Parts |
|---|---|
| Hydrogenated vegetable oil (M.P. 105–120° F.) | 10 |
| Dry malt extract (dissolved in sufficient water to provide a total moisture content for the mixture of 4.5±0.5%) | 10 |
| Salt | ½ |
| Ground expanded wheat | 79.5 |

The mixture was then pressed in a die into wafers having a thickness of about ¼", using a die temperature of 40–60°C. and a pressure on the die of 5,000–10,000 lbs./sq. in.

The resulting wafers were cooled and wrapped in a plastic-metal foil laminate to provide a barrier to the entry of air and moisture.

These wafers can be consumed directly or crumbled into skim milk, soups, or other edible liquids. They are especially adapted for shelter rations because they have good storage stability, a high bulk density of about 71 lbs. per cu. ft. (this is important as space for provisions is limited in shelters), and have a high nutritive value of 1,900 calories/lb.

*Example 6*

A series of formulations were prepared, then stored at elevated temperature (in air and in nitrogen) and smelled to determine their relative stability. The formulations were as follows:

(A) Ground expanded wheat alone.
(B) Ground expanded wheat, 90%; malt extract, 10%.
(C) Ground expanded wheat, 90%; hydrogengated fat, 10%.
(D) Ground expanded wheat, 80%; malt extract, 10%; hydrogenated fat, 10%.
(E) Ground expanded wheat, 80%; malt extract, 10%; hydrogenated fat, 10%; butylated hydroxyanisole (antioxidant), 0.005%.

The results are tabulated below:

[Products stored 47 days at 110° F.]

| Product | Additive | Score [1] | |
|---|---|---|---|
| | | Stored in air | Stored in $N_2$ |
| A | None | 2 | 0.33 |
| B | Malt extract | 2 | 0.66 |
| C | Fat | 1.33 | 0.66 |
| D | Malt extract and fat | 0 | 0 |
| E | Malt extract, fat, and BHA | 0 | 0 |

[1] The products were scored by a panel on the following basis: 0=no rancid odor; 1=slight rancid odor; 2=rancid odor.

The above data is of particular interest to indicate that the combination of fat and malt extract (sample D) produces a formulation markedly superior in stability to the products having malt extract alone (B) or fat alone (C).

Having thus described the invention, what is claimed is:

1. A process for preparing a directly-consumable food ration which comprises providing grains of dry, parboiled wheat having a dense, vitreous texture and a moisture content about from 6 to 14%, contacting said wheat with a current of air having a temperature about from 400 to 650° F. for a sufficiently long period of time whereby the grains are expanded to form porous grains having the same shape as the original grains, the expansion causing the formation of a multitude of small spheroidal voids uniformly dispersed throughout the interior of the grains, said porous grains having a volume of about 1.5 to 2 times that of the original grains and being readily rehydratable and consumable without cooking, grinding said expanded wheat to form a mixture having a range of particle sizes from half-grains and quarter-grains to 60-mesh particles, admixing said ground material with an edible binder and compressing the mixture into a self-sustaining shape.

2. The method of claim 1 wherein the said binder contains fat and malt extract.

References Cited by the Examiner

UNITED STATES PATENTS

| | | | |
|---|---|---|---|
| 2,170,155 | 8/39 | Musher | 99—83 |
| 2,185,053 | 12/39 | Dils | 99—81 X |
| 2,278,466 | 4/42 | Musher. | |
| 2,505,325 | 4/50 | Hubbard | 99—81 |
| 2,616,808 | 11/52 | Roberts | 99—81 |
| 2,622,985 | 12/52 | Haughey | 99—81 |
| 2,785,070 | 3/57 | Kester et al. | 99—81 |
| 2,884,327 | 4/59 | Robbins | 99—80 |
| 2,992,921 | 7/61 | Bardet et al. | 99—81 X |

A. LOUIS MONACELL, *Primary Examiner.*

ABRAHAM H. WINKLESTEIN, RAYMOND N. JONES, *Examiners.*